United States Patent Office 3,276,790
Patented Oct. 4, 1966

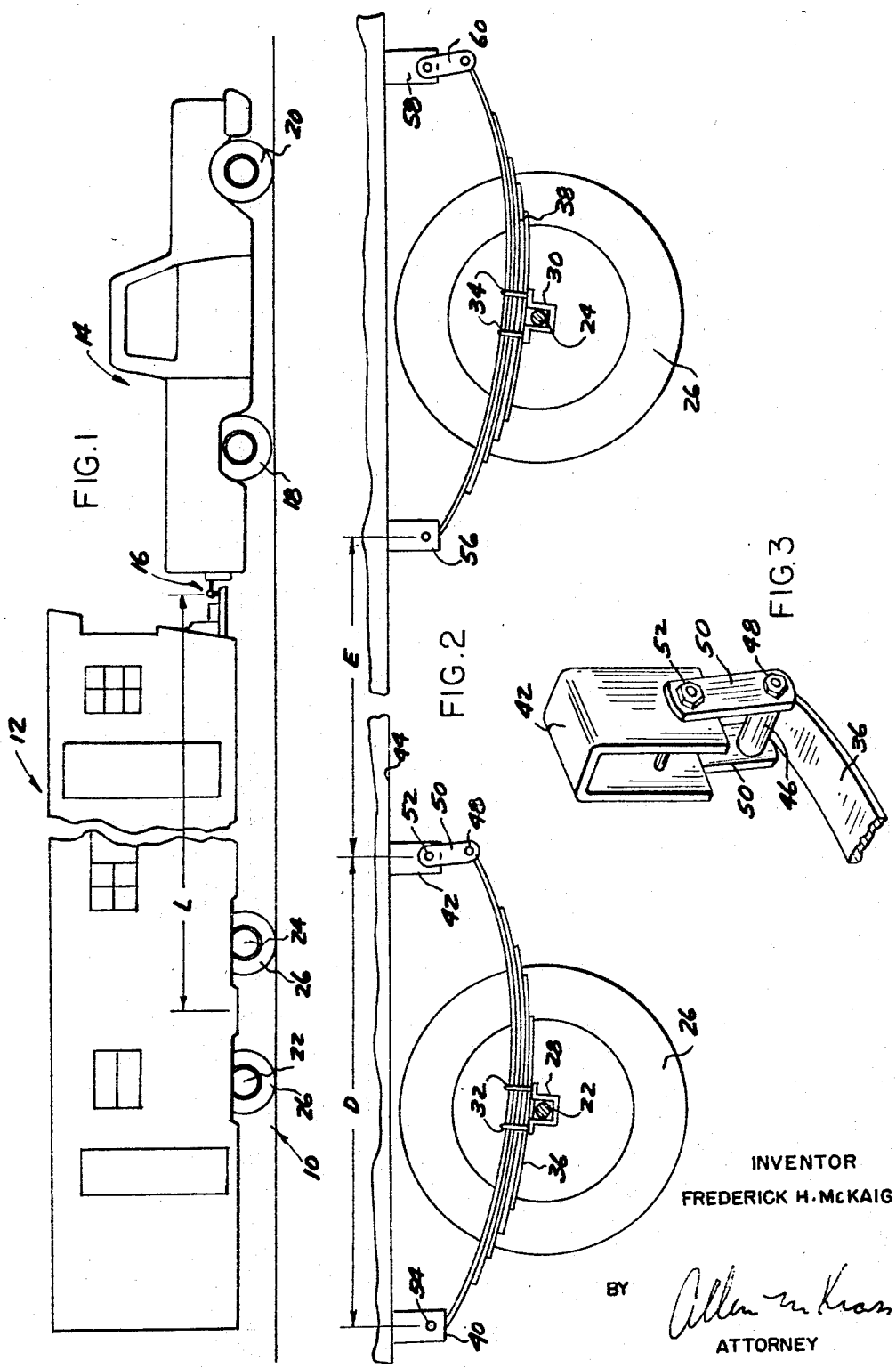

3,276,790
WHEEL ARRANGEMENT FOR MOBILE HOMES
Frederick H. McKaig, Birmingham, Mich., assignor to Guerdon Industries, Inc., Southfield, Mich., a corporation of Delaware
Filed Nov. 3, 1965, Ser. No. 506,183
6 Claims. (Cl. 280—400)

This invention relates to mobile homes and more particularly to a unique arrangement for the axles and wheels of mobile homes.

Mobile homes are adapted to be transported between locations by trailing them behind trucks or automobiles. In these sense they are similar to truck-trailers which are adapted to be pulled behind specially designed tractors. Such truck-trailers normally have one or more sets of wheels supported on axles disposed adjacent to the rear end of the trailer. The front end of the trailer hitches to the tractor at a point directly above a rear axle of the tractor. In this manner the weight of the trailer is generally evenly distributed between its own wheels and the rear wheels of the tractor. The hitch between a mobile home and its towing vehicle is not made above the rear axle of the vehicle but rather at a point displaced behind this rear axle. This is because of the necessity of designing the mobile home so that it may be towed by an automobile, which necessitates that the hitch be made adjacent to the rear bumper of the vehicle. If a mobile home were constructed with the wheels adjacent to its rear end, as is a truck-trailer, a large portion of the weight of the mobile home would be imposed on the towing automobile at the hitch point, behind the auto's rear axle, and this would impose moments on the car which would tend to tip its front end upwardly about the rear axle. Such a condition is not permissible because of the steering difficulties which would arise. Accordingly, mobile homes are conventionally constructed with their axles arranged at some point between their center and their rear end, so that a major part of the weight of the mobile home is supported on this axle and only a small percentage of the weight is imposed on the rear end of the vehicle.

One undesirable result of this wheel arrangement is that the rear end of the mobile home is cantilevered outwardly from the rear axle and tends to develop a downward sag. A similar sag occurs between the hitch point and the forwardmost axle of the mobile home. When more than one axle is provided in the mobile home they are normally disposed immediately adjacent to each other and their leaf spring suspensions share a common center hanger post.

It is a primary object of the present invention to provide a wheel arrangement for a mobile home wherein the axles are so positioned as to tend to even out the load imposed at points on the mobile home frame to minimize the unsupported and cantilever lengths which tend to form sags and "bellies" in use.

In a preferred embodiment of the present invention, which will subsequently be disclosed in detail, this object is achieved by providing a pair of axles supported from leaf springs which are attached to the mobile home frame by means of two pairs of separated hangers. The two center hangers, that is the front hanger for the rear axle and the rear hanger for the front axle, are displaced from one another by a distance which is roughly equal to the distance between each pair of hangers in a set. The center line of the entire axle assembly, that is the line midway between the two axles, is disposed roughly a little less than two-thirds of the entire length of the frame from the hitch point. It has been found that the disposition of the center line between the two axles may be displaced between limits set at 55 and 70 percent of the length of the mobile home from the forward hitch. This arrangement results in the large part of the weight of the mobile home being supported on its own wheels so that relatively low downward moments are imposed upon the hitch of the towing vehicles and also results in an equal force distribution on the frame of the mobile home over a wide area so as to minimize the sagging or bellying which is experienced with conventional wheel constructions.

This equalization of stress on the frame allows the use of a lighter weight frame than would be required with the conventional wheel arrangement with its high stress concentration points.

It is therefore seen to be an object of the present invention to provide a wheel arrangement for a mobile home which employs a pair of axles, with each axle suspended on an independent pair of hangers, with the front hanger of the rear axle and the rear hanger of the front axle being displaced from one another by a distance at least roughly equal to the space between a set of hangers.

It is another object to provide such a wheel arrangement wherein the center line between the two axles is disposed no less than 55 percent of the length of the mobile home from the forward hitch and no greater than 70 percent of this length.

Other objects, advantages and applications of the present invention will be made apparent by the following detailed description of a preferred embodiment of the invention. The description makes reference to the accompanying drawings in which:

FIGURE 1 is a side view of a mobile home incorporating a wheel assembly in accordance with a preferred embodiment of the invention, hitched to a towing automobile;

FIGURE 2 is a side view of the wheel assembly area of the frame of the mobile home, showing the preferred spring arrangement; and FIGURE 3 is a detailed perspective view of the connection between a spring hanger and one of the spring ends.

Referring to the drawings, the preferred embodiment of the invention provides a wheel arrangement, generally indicated at 10, for a mobile home, generally indicated at 12. The mobile home is adapted to be towed by an automobile, generally indicated at 14, and is attached to the auto by a hitch assembly, generally indicated at 16, located adjacent to the rear bumper of the auto and the forward end of the mobile home frame assembly.

It should be noted that the hitch point 16 is well behind the rear wheels 18 of the auto. This is the situation which creates the problem solved by the present invention. If the hitch point 16 were above the rear wheels of the towing vehicle, as it is in a truck-trailer arrangement, the rear wheels of the vehicle could simply be considered as one of the supporting wheels of the trailer in deciding where to place the other wheels (normally to the extreme rear of the trailer). In the present situation, the hitch 16 must not bear any substantial proportion of the weight of the mobile home or moments will be imposed on the auto 14 which will tend to cause its forward wheels 20 to lift upwardly about the rear axle, making it dangerous and diffcult to steer. While separated wheel assemblies of the type employed in the preferred embodiment have been used in truck-trailers in order to equalize the load on the pavement, their arrangement and positioning has been quite different from that of the present invention and such arrangements are not intended or capable of solving the problem proposed by the towing method associated with mobile homes.

The wheel assembly 10 includes a rear axle 22 and a forward axle 24. Were a line to be drawn transversely to the length of the mobile home, midway between the two axles 22 and 24, the preferred embodiment of the present invention contemplates that this line be disposed approximately 60 percent of the length of the mobile home from the front hitch point 16. This insures that the wheel assembly 10 will support the major portion of the weight of the mobile home 12 without imposing any large downwardly directed forces on the hitch of the automobile 14. We have determined that the critical limits of the positioning of the central line between the axles are in the range between 55 and 70 percent of the length of the mobile home, from the front hitch 16. This dimension is indicated in FIGURE 1 and denominated "L."

Each axle supports a pair of wheels 26 in a conventional manner. The axles themselves are retained in U-shaped saddles 28 and 30, (the entire assembly employing four saddles but only two being shown in the drawings). The saddles 28 and 30 are joined by U-bolts 32 and 34 to the centers of sets of leaf springs 36 and 38. The rear leaf springs 36 are supported on rear hangers 40 and forward hangers 42. The details of hanger 42 is disclosed in FIGURE 3. It consists of a U-shaped steel bracket with its arms directed downward. Its upper end may be welded or otherwise secured to a longitudinal frame member 44 of the mobile home. The longest leaf of the spring 36 has an eye 46 formed at its end. A bolt and nut assembly 48 passes through the eye 46 and thus joins it to the lower end of a pair of equalizer or shackle arms 50. Another nut and bolt assembly 52 retains the shackle arms 50 to holes formed in the opposed arms of the hanger bracket 42.

The rear end of the spring 36 connects directly to the hanger bracket 40 by means of a pin 54. A similar arrangement is employed to retain the rear springs 38 to rear hanger brackets 56 and forward hanger brackets 58 through shackles 60.

The distance between the forward hanger bracket 42 of the rear spring assembly and the rear hanger bracket 56 of the forward spring assembly is preferably roughly equal to the distance between each of the forward and rear pairs of hanger brackets. In FIGURE 2 the distance between the rear spring hanger 40 and the forward spring hanger 42 of the rear assembly, has been denominated D while the distance between the spring bracket 42 and the rear spring bracket 56 of the forward spring assembly has been denominated E. In the preferred embodiment of the invention the dimension E is slightly greater than the dimension D. However, it is critical to the present invention that there be a somewhat rough equality between the dimensions D and E. For example, an arrangement wherein the dimension E was equal to more than twice the dimension D would not fall within the scope of the present invention.

By making the dimensions E equal to the dimension D the weight of the mobile home 12 is roughly equally distributed between the four sets of hanger brackets 40, 42, 56 and 58 with only a relatively small portion of the weight being imposed on the hitch 16. In the interval between the rearmost hanger brackets 40 and the forwardmost hanger brackets 58, the weight is almost completely equally distributed. This arrangement avoids the stress concentration of the prior art and allows the use of a thinner frame without excessive sagging or bellying.

Having thus described my invention, I claim:

1. A mobile home adapted to be towed by a vehicle having a rear wheel assembly and a hitching means disposed rearwardly of said rear wheel assembly, said mobile home comprising
    (a) an elongated frame,
    (b) a hitch attached to one end of said frame and adapted to be connected with said hitching means whereby the hitch point between said mobile home and said vehicle is disposed rearwardly of the rear wheel assembly of said vehicle,
    (c) a pair of axles extending transversely of the frame and wheels rotatably supported on said axles,
    (d) two sets of leaf springs attached at their midpoints to said axles, and a pair of hangers for each leaf spring,
    (e) said hangers being joined to said frame at spaced points such that the distance between the forwardmost hanger for the rear axle and the rearmost hanger for the forward axle is approximately equal to the distance between the pair of hangers for each axle, and
    (f) said axles being positioned with respect to said frame such that a line drawn parallel to the axles and midway between them is disposed between 55 and 70 percent of the total length of the frame from the forward hitch.

2. The mobile home as defined in claim 1 and in which said last mentioned line is disposed 60 percent of the total length of said mobile home from said hitch point.

3. The mobile home as defined in claim 1 and in which said frame comprises a pair of longitudinally extending and parallel frame members, each of said frame members extending from the front of said mobile home and past said axles to the rear of said mobile home.

4. The mobile home as defined in claim 1 and in which said frame comprises a pair of longitudinally extending and parallel frame members, each of said hangers on one side of said mobile home being fixed to one of said frame members and each of said hangers on the other side being fixed to the other of said frame members.

5. A mobile home adapted to be towed by a vehicle having a rear wheel assembly and a hitching means disposed rearwardly of said rear wheel assembly, said mobile home comprising
    (a) an elongated frame,
    (b) a hitch attached to one end of said frame and adapted to be connected with said hitching means whereby the hitch point between said mobile home and said vehicle is disposed rearwardly of the rear wheel assembly of said vehicle,
    (c) a pair of axles extending transversely of the frame and wheels rotatably supported on said axles,
    (d) two sets of leaf springs attached at their midpoints to said axles,
    (e) two sets of spring hangers attached to the ends of each of the leaf springs and joined to the frame,
    (f) the points of connection of the spring hangers to the frame being such that the distance between a set of spring hangers connected to the same spring is substantially equal to the distance between the forwardmost spring hanger for the rear axle and the rearmost spring hanger for the forward axle, and
    (g) said axles being positioned with respect to said frame such that a line drawn parallel to the axles and midway between them is disposed substantially 60 percent of the total length of the mobile home from said hitch point.

6. The mobile home as defined in claim 5 and in which said frame comprises a pair of parallel frame members extending from the front to the rear of said mobile home and each of said spring hangers on one side of said mobile home being fixed to one of said frame members and the spring hangers on the opposite side of said mobile home being fixed to the other of said frame members.

References Cited by the Examiner

UNITED STATES PATENTS 3,055,677  9/1962  Smith _____ 280—104.5
3,157,427  11/1964  Reynolds _____ 296—23
3,191,966  6/1965  Felburn _____ 280—81 X LEO FRIAGLIA, *Primary Examiner.*